May 6, 1941.   B. H. CARROLL ET AL   2,241,239
ULTRAVIOLET LIGHT FILTER
Filed Jan. 19, 1940

BURT H. CARROLL
CYRIL J. STAUD
INVENTORS
BY
ATTORNEYS

Patented May 6, 1941

2,241,239

UNITED STATES PATENT OFFICE 2,241,239

ULTRAVIOLET LIGHT FILTER

Burt H. Carroll and Cyril J. Staud, Rochester, N. Y., assignors to Eastman Kodak Company, Rochester, N. Y., a corporation of New Jersey Application January 19, 1940, Serial No. 314,667
In Great Britain January 23, 1939

10 Claims. (Cl. 95—2)

This invention relates to filters for ultraviolet light and particularly to such filters as used with photographic sensitive material.

It is known that certain materials such as cellulosic films and photographic layers are affected by ultraviolet light rays, these rays in the case of sensitive photographic layers sometimes causing an undesired exposure of the layer. Photographic silver halide emulsions are sensitive to blue, violet and ultraviolet regions of the spectrum in addition to any other sensitivity which may be given them and in the exposure of such material it is frequently desirable to prevent the action of ultraviolet light on the sensitive emulsion. This is especially true in the case of photographic material designed for use in color photography where the film has been sensitized to the longer wave length regions and where it is desirable to record only the rays of the visible spectrum.

Ultraviolet absorbing materials have previously been used in filter layers for cellulosic film and photographic layers but many of these filter materials have been objectionable because they are decomposed by light and hence lose their light absorbing properties. It is, therefore, an object of the present invention to provide a novel ultraviolet filtering material for cellulosic film and photographic layers. It is a further object of the present invention to provide an ultraviolet filtering material which is not readily decomposed by visible or ultraviolet light rays. Other objects will appear from the following description of our invention.

These objects are accomplished by incorporating in gelatin or other colloidal material an unsaturated aryl acetophenone, and applying this material as a layer to the sheet or film desired to be protected.

Figure 1:
Figure 2:
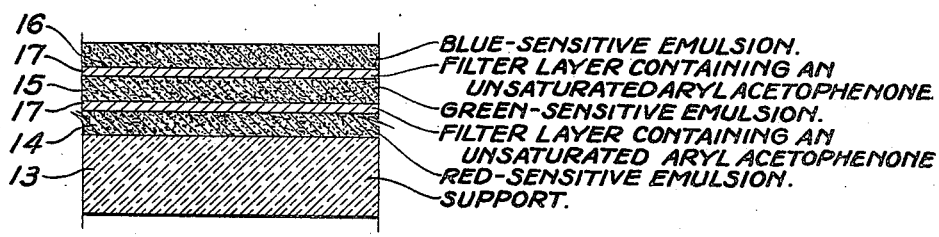

In the accompanying drawing, Fig. 1 is a sectional view of a single layer photographic film having an overcoated filtering layer made according to our invention and Fig. 2 is a sectional view of a multi-layer photographic film having intermediate filter layers made according to our invention.

The compounds which we propose to use as ultraviolet absorbing materials are unsaturated aryl acetophenones of which the following may be cited as specific examples:

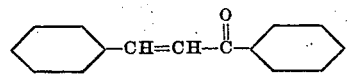

Benzal acetophenone

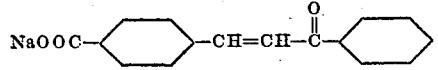

Carboxybenzal acetophenone
(Sodium salt)

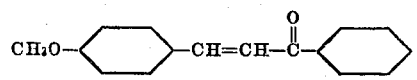

Anisal acetophenone

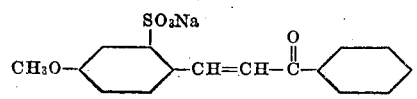

3-Sulfoanisal acetophenone
(Sodium salt)

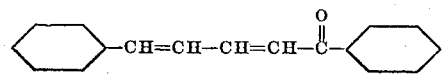

Cinnamal acetophenone

These compounds are unsaturated arylacetophenones having a carbon chain containing a conjugated system of double bonds, one of the terminal atoms of the chain being the oxygen atom of the acetophenone. The chain contains methine groups which form a conjugated system of double bonds together with the carbonyl groups of the acetophenone.

The light absorption range of these compounds varies to some extent with the particular compound used but in general the unsaturated aryl acetophenones absorb rather completely in the long wave length ultraviolet region of 300—400 millimicrons and absorb very little visible light.

In making a light filter according to our invention, a suitable amount of one or more of the unsaturated aryl acetophenones listed above is incorporated in a suitable colloidal material such as gelatin, agar, cellulose esters or ethers or synthetic resins. These resins include the polyvinyl esters, such as polymerized vinyl acetate which is known, for example, under the trade name "Gelva," the preparation of which is described in the U. S. Patents Nos. 1,241,738, 1,586,803 and 1,710,825. A further type of resin which may be used is the polyvinyl acetal type. These resins are condensation products of partially or completely hydrolyzed polyvinyl acetate and an aldehyde, such as formaldehyde, acetaldehyde, or butyraldehyde, and are known as polyvinyl acetals. They are sold under various trade names, such as "Formvar" and "Alvar." A still further type of resin which I may use is the alkyd type, which is a condensation product of a polybasic acid and a polyhydroxy alcohol. An example of this type of resin is "glyptal," which is a condensation product of glycerine and phthalic acid or phthalic anhydride.

These ultraviolet filtering layers may be applied to photographic film wherever it is desirable to absorb ultraviolet light rays. They may be applied over a sensitive layer or between sensitive layers of a multi-layer photographic film or they may be applied to a finished photographic picture to prevent deterioration of the finished picture. They may also be applied to materials such as cellulose acetate sheeting or to other sheet material to prevent action of ultraviolet light on the material.

The following examples which are illustrative only indicate methods of coating an ultraviolet filter layer according to our invention:

Example 1

A solution of the sodium salt of 3-sulfoanisal acetophenone is prepared by dissolving 3.19 grams in 100 cc. of water plus 0.40 gram sodium hydroxide. 29 cc. of this solution is added to 300 cc. of a solution of gelatin in water 12% by weight. These are thoroughly mixed and coated on glass at a temperature of about 40° C., approximately 65 cc. of the gelatin-dye solution being spread over 1000 sq. cm. Such a coating has an optical density of 2 at 390 m$\mu$ and still greater at shorter wavelengths, while the density at 420 m$\mu$ is only 0.2.

Example 2

A solution of benzalacetophenone is prepared by dissolving 2.1 grams in 100 cc. of a solvent such as methanol. This solution is mixed with 200 cc. of a solution of a colloidal material such as cellulose acetate phthalate or polyvinyl phthalate, 10 grams per 100 cc., in a suitable solvent mixture such as 50 cc. methanol, 75 cc. acetone and 75 cc. of the methyl ether of ethylene glycol ("methyl Cellosolve"). This is then spread over a film at the rate of approximately 10 cc. per 1000 sq. cm. and forms a layer which can be removed by treatment with an alkaline solution such as a photographic developer, with agitation.

Our invention will now be described with particular reference to the accompanying drawing. As shown in Fig. 1, a support 10 of any suitable material such as cellulose acetate, cellulose nitrate, synthetic resin or paper is coated with a silver halide emulsion layer 11 and a filter layer 12 of gelatin or other colloidal material containing an unsaturated aryl acetophenone.

Fig. 2 shows another modification of our invention in which a transparent support 13 of any suitable transparent material such as cellulose nitrate or cellulose acetate carries silver halide emulsion layers 14, 15 and 16 sensitive respectively to the red, green and blue regions of the visible spectrum. Between emulsion layers 14 and 15 and between emulsion layers 15 and 16, there are ultraviolet filter layers 17 containing an unsaturated aryl acetophenone. An element of this type is useful in a photographic process such as that described in Schinzel U. S. application 223,948, filed August 9, 1938 in which the several sensitive layers are processed separately and it is desirable to prevent the action of ultraviolet light on the middle layer 15 at some stage in the processing. It is to be understood that this film may also contain other filtering materials in the filter layers 17 such as blue- or green-absorbing material and that the film may also have other layers such as the usual subbing and backing layers thereon.

In addition to their use as light filtering material in an inert gelatin or colloidal layer, the acetophenones may also be incorporated in a sensitive emulsion layer or may be incorporated in a layer of gelatin or other colloidal material used as a backing on the rear side of the photographic element. Other uses will suggest themselves to those skilled in the art. It is to be understood that our invention may be used in other ways not herein specifically mentioned and that our invention is to be taken as limited only by the scope of the appended claims.

We claim:

1. A film affected by ultraviolet light having thereon a layer of a colloidal material containing an unsaturated aryl acetophenone containing a chain having a conjugated system of double bonds, one of the terminal atoms of the chain being the oxygen atom of the acetophenone, uniformly dispersed therein.

2. A photographic element having thereon a layer affected by ultraviolet light and over said layer a layer of a colloidal material containing an unsaturated aryl acetophenone containing a methine chain which forms a conjugated system of double bonds with the carbonyl group of the acetophenone, uniformly dispersed therein.

3. A photographic element having thereon a layer sensitive to ultraviolet and visible light rays and over said sensitive layer a layer of a colloidal material containing an unsaturated aryl acetophenone containing a methine chain which forms a conjugated system of double bonds with the carbonyl group of the acetophenone, uniformly dispersed therein.

4. A photographic element having thereon a gelatin silver halide emulsion layer sensitive to ultraviolet and visible light rays and over said emulsion layer a layer of gelatin containing an unsaturated aryl acetophenone containing a methine chain which forms a conjugated system of double bonds with the carbonyl group of the acetophenone, uniformly dispersed therein.

5. A photographic element having thereon a gelatin silver halide emulsion layer sensitive to ultraviolet and visible light rays and over said emulsion layer a layer of gelatin containing a benzal acetophenone.

6. A photographic element having thereon a gelatin silver halide emulsion layer sensitive to ultraviolet and visible light rays and over said emulsion layer a layer of gelatin containing a carboxy benzal acetophenone.

7. A photographic element having thereon a gelatin silver halide emulsion layer sensitive to ultraviolet and visible light rays and over said emulsion layer a layer of gelatin containing an anisal acetophenone.

8. A photographic element having thereon a gelatin silver halide emulsion layer sensitive to ultraviolet and visible light rays and over said emulsion layer a layer of gelatin containing a sulfoanisal acetophenone.

9. A photographic element having thereon a gelatin silver halide emulsion layer sensitive to ultraviolet and visible light rays and over said emulsion layer a layer of gelatin containing a cinnamal acetophenone.

10. A multi-layer photographic film comprising a transparent support having a plurality of emulsion layers thereon and over at least one of said layers a layer of gelatin containing an unsaturated aryl acetophenone containing a methine chain which forms a conjugated system of double bonds with the carbonyl group of the acetophenone, uniformly dispersed therein.

BURT H. CARROLL.
CYRIL J. STAUD.